United States Patent [19]

Konrad et al.

[11] Patent Number: 5,287,051
[45] Date of Patent: Feb. 15, 1994

[54] METHOD AND APPARATUS FOR IMPROVED EFFICIENCY IN A PULSE-WIDTH-MODULATED ALTERNATING CURRENT MOTOR DRIVE

[75] Inventors: Charles E. Konrad; Richard W. Boothe, both of Roanoke, Va.

[73] Assignee: General Electric Company, Schenectady, N.Y.

[21] Appl. No.: 837,467

[22] Filed: Feb. 14, 1992

[51] Int. Cl.$^5$ ............................................. H02P 5/40
[52] U.S. Cl. ................................... 318/803; 318/811
[58] Field of Search .............. 318/138, 254, 439, 723, 318/800, 802, 801, 803, 807, 811, 812

[56] References Cited

U.S. PATENT DOCUMENTS

| | | | |
|---|---|---|---|
| 4,129,808 | 12/1978 | Bregeault et al. | 318/254 |
| 4,446,414 | 5/1984 | Tupper | 318/812 |
| 4,490,666 | 12/1984 | Tanamachi et al. | 318/802 |
| 4,546,294 | 10/1985 | Ban et al. | 318/138 |
| 4,629,959 | 12/1986 | Okuyama et al. | 318/802 |
| 4,651,067 | 3/1987 | Ito et al. | 318/254 |
| 4,926,104 | 5/1990 | King et al. | 318/599 |
| 4,967,135 | 10/1990 | Ashikaga et al. | 318/808 |
| 5,038,092 | 8/1991 | Asano et al. | 318/811 |

Primary Examiner—William M. Shoop, Jr.
Assistant Examiner—John W. Cabeca
Attorney, Agent, or Firm—Bell, Seltzer, Park & Gibson

[57] ABSTRACT

A scheme for optimizing the efficiency of an AC motor drive operated in a pulse-width-modulated mode provides that the modulation frequency of the power furnished to the motor is a function of commanded motor torque and is higher at lower torque requirements than at higher torque requirements.

19 Claims, 3 Drawing Sheets

METHOD AND APPARATUS FOR IMPROVED EFFICIENCY IN A PULSE-WIDTH-MODULATED ALTERNATING CURRENT MOTOR DRIVE

The Government of the United States of America has rights in this invention pursuant to Contract Number DE-AC07-90ID13019 awarded by the U.S. Department of Energy.

FIELD OF THE INVENTION

The present invention relates generally to pulse-width-modulated alternating current motor drives and more particularly to a method and apparatus for improving the overall efficiency of a pulse-width-modulated motor drive operating under a variety of load conditions, especially in applications such as might be found on on-road electric motor vehicles.

BACKGROUND OF THE INVENTION

It is known that a number of factors affect the efficiency of an alternating current (AC) motor drive. (As used herein, the term "drive" is intended to include the motor, its power supply, and the control of the power supply, including command and feedback signals.) One of the main factors is that the closer the wave shape of the power supplied to the motor approaches a sine wave, the lower the total harmonic distortion. Lower harmonic distortion means less motor heating and improved efficiency.

When a variable speed AC drive is desired, it is common to effect that variable speed by furnishing the motor with variable frequency power. This is customarily achieved by furnishing power to the motor by way of a power conversion bridge, the most common form of which is a three phase bridge comprised of three legs, each having a positive side and a negative side in what is often referred to as a six step inverter. Since each of the legs of the inverter is normally formed of a semiconductor switch arrangement operating in a binary mode, the basic output of the inverter is essentially a three phase, square wave line-to-line voltage. One way of improving the wave shape of the inverter output, that is to better approach a sine wave, is through the use of pulse-width-modulation (PWM). In a PWM inverter the basic output of the bridge is a square wave having a fundamental frequency which largely determines the motor speed. PWM places pulses (or notches depending upon the way the wave shape is viewed) within the basic square wave output of the bridge to improve the wave form; i.e., to make it more like a sine wave, and therefore reduce the harmonics distortion. As a general rule, the greater number of pulses, the better the wave form.

Increasing the number of the pulses is, however, not without problems since there are losses associated with each switching of the semiconductor switches of the bridge. These losses occur both when the switches are turned on and turned off and are a function of the current being carried. As such, the higher the frequency of switching and the higher the current carried by the switches, the higher the losses.

One example of a situation in which efficiency is extremely important is that of on-road electric vehicles. As is known, the major problem with these vehicles today is the energy-to-weight ratio of the battery systems which results in a serious restriction on the range of the vehicle. It is, however, important to realize that in this particular application, greater overall efficiency can be realized by maximizing the efficiency during the times of lighter loads since this is where the vehicle operates the largest amount of time. For example, in what is considered to be a typical application, a vehicle might require approximately 5 to 10 pound-feet of torque when cruising (e.g. in the 50 to 60 miles per hour range), the mode of operation most common from a time standpoint. Heavy torque requirements, those above 15 pound-feet are normally of a very transient nature, such as upon starting or climbing a steep hill. Thus, enhanced overall efficiency can be achieved by optimizing the efficiency of the operation of the drive during the longer periods of operation which are at lighter torque requirements.

SUMMARY OF THE INVENTION

The efficiency optimization of the present invention is achieved by a method and apparatus of controlling a PWM AC motor drive which drive includes a polyphase power conversion bridge for providing PWM electrical power to an AC motor as a function of current switching signals. The current switching signals effect bridge operation at a fundamental frequency proportional to desired motor speed and further provide a switching or modulation frequency as a function of a torque command signal. The switching or modulation occurs at a higher frequency at lower torque command signal values and a lower frequency at higher torque command signal values. The higher switching frequencies result in a power wave shape more closely approximating a sine wave and thus low harmonic heating of the motor when switching currents are small. Lower switching frequencies are associated with higher motor currents. Thus, this scheme recognizes the losses associated with increased switching frequency but also recognizes that low torque also means low current and therefore switching losses are low. By varying the switching frequency between two predetermined limits, as a function of required torque, drive efficiency is optimized over the operating period of the system.

BRIEF DESCRIPTION OF THE DRAWING

While the present invention is defined in particularity in the claims and annexed to and forming a part of this specification, a better understanding, thereof, can be had by reference to the following specification taken in conjunction with the accompanying drawing in which:

DETAILED DESCRIPTION

Figure 1:
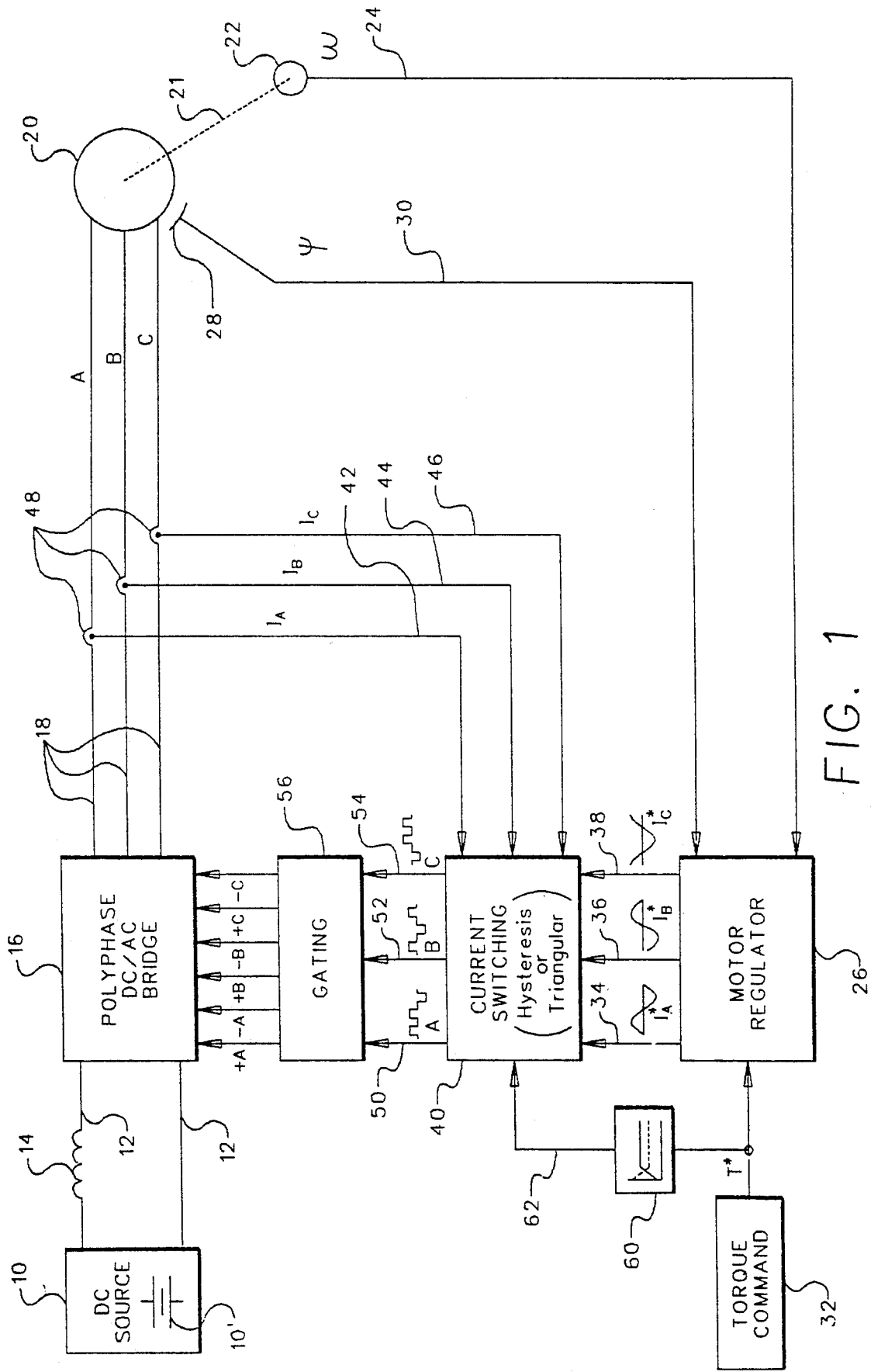
FIG. 1 is a block schematic diagram of an AC motor drive embodying the present invention; and, FIGS. 2 through 6 are various graphical representations helpful in understanding the invention.

FIG. 1 illustrates in major block diagram form the present invention in its preferred embodiment. As shown in FIG. 1 there is provided a source of direct current (DC) power 10. In the primary illustrative embodiment of an on-road electric vehicle, this source would be comprised of a battery, as indicated at 10'. It is to be understood, however, that for other applications, other forms of DC sources could be used. Primary among such other sources is a rectifier bridge supplied from an At source as is well known in the art. The DC power is applied via a DC bus 12 to a polyphase DC/AC power conversion bridge 16. Included in DC bus 12 is an inductor 14. Where the DC source is a battery a discrete inductance might not be necessary and 14 would represent the distributed line inductance. On the other hand, if the DC source 10 were, as was earlier indicated, a rectifier bridge connected to a source of AC power, a discrete (larger) inductor would probably be required.

The DC/AC bridge 16 may be of the well known configuration. In the illustrative embodiment here being considered, it is a three phase bridge of the six step type operated in a PWM mode. The bridge is preferably comprised of any suitable semiconductor devices such as insulated gate bipolar transistors (IGBT), MOS controlled thyristors (MCT), field effect transistors (FET) or gate turn-off thyristors all as well known in the art and all of which, in the present state of the art, have associated fast recovery inverse paralleled diodes.

The output of the bridge 16 is applied via an AC bus 18 to an AC motor 20. The three phases are indicated as A, B and C as is customary in the art. Motor 20 is preferably an induction motor or a synchronous motor. Associated with the motor, as indicated by the dashed line 21, is a tachometer 22 which provides an output signal $\omega$ on line 24 to a motor controller 26. The value of the w signal is representative of motor speed. Also provided to the motor controller 26 is a signal $\psi$ representing motor flux. As illustrated in FIG. 1 the $\psi$ signal is derived from a suitable means such as a flux coil 28 associated with the motor 20 which is here included solely to illustrate an improved means to control motor flux.

The third input to the motor regulator 26 is a signal $T^*$, a torque command signal, from a suitable source 32. The value of the $T^*$ signal represents the value of desired motor output torque. The exact nature of the torque command block 32 is not of importance to the present invention; it could be an operator input or a system responding to various input and feedback signals to develop the signal. In the present example of a electric vehicle, the torque command 32 might function in response to accelerator pedal position to develop the $T^*$ signal.

The outputs of the motor regulator 26, appearing on lines 34, 36 and 38, are replicas of the desired phase currents to be supplied to the motor. These are designated, respectively, as $I_A^*$, $I_B^*$ and $I_C^*$. These three signals are applied to a current switching block 40 which also receives current signals via lines 42, 44 and 46. These signals which are respectively designated $I_A$, $I_B$ and $I_C$ are derived by suitable means such as current sensors 48 in the lines of the AC bus and are signals proportional to actual phase currents furnished to the motor 20. Current switching block 40 responds to the six current related input signals and to an additional input (line 62), to be described, to provide output signals on lines 50, 52 and 54. These latter output signals are the basic switching signals for three phases of bridge 16. The actual gating signals are developed in a standard commercial integrated chip known as IXDP630 by IXYS Corporation of San José, Calif. (block 56), and these gating signals are provided to the positive and negative portions of the bridge as indicated by the plus and minus designations of the three phases A, B and C.

The description thus far relates to that which is well known in the art. The bridge 16, as earlier indicated, would normally be a six step semiconductor inverter operating in a pulse-width-modulated mode. The motor regulator 26 could also be of any convenient type such as a "controlled slip" or "field oriented" controller. The current switching block 40 as will be further discussed preferably provides either hysteresis or triangular type switching. If further information is desired relative to any of these components attention is called to the book *Power Electronic Control of AC Motors* by J.M.D. Murphy and F.G. Turnbull, Pergamon Press, copyright 1988, Library of Congress Cataloging in Publication Data TK2781.M87 1988 621.46'2 88-6031.

The present invention includes the just described type of drive taken in conjunction with the block 60 and its effect upon the system. As shown in FIG. 1 the torque command signal $T^*$ is applied to a function block 60 the output of which (line 62) is applied to the current switching block 40. As will be further explained with respect to the remaining figures, two types of functions are indicated in block 60. The first, shown in solid line, is applicable to a hysteresis type switching while that shown by the dashed line is applicable to a triangular type switching system, both which, as was previously indicated, are described in the aforementioned reference.

Figure 2:
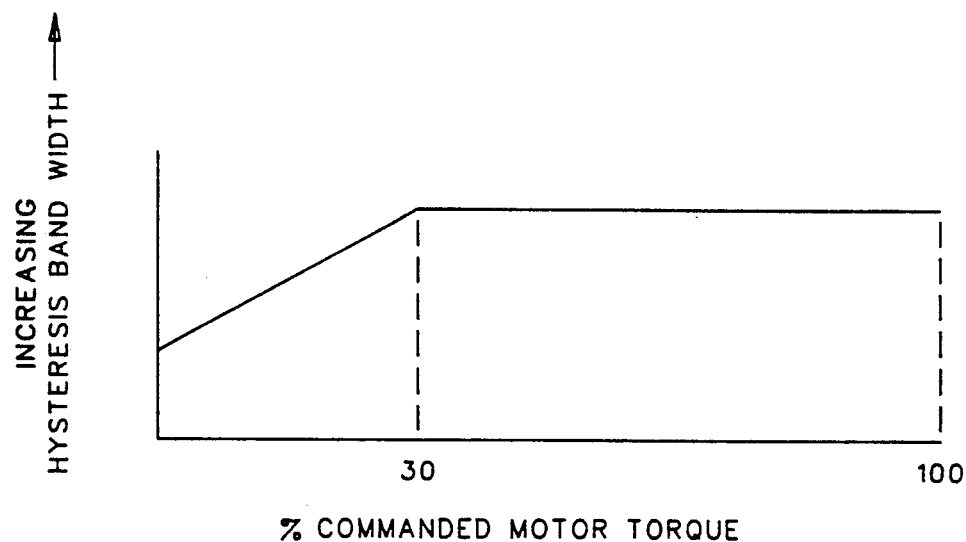
Figure 3:
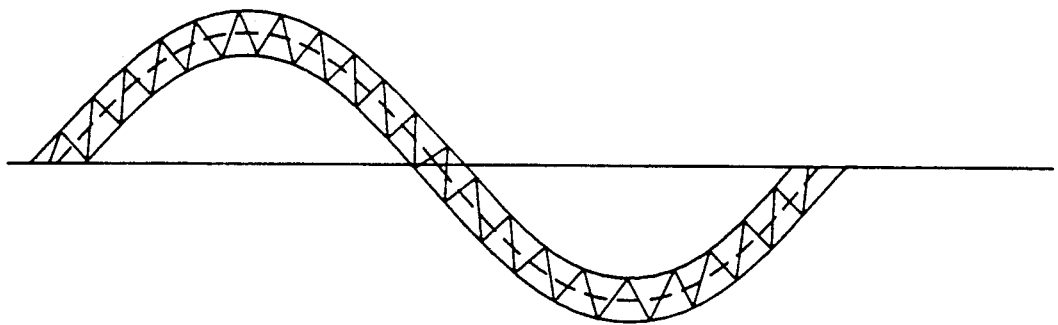
Figure 4:
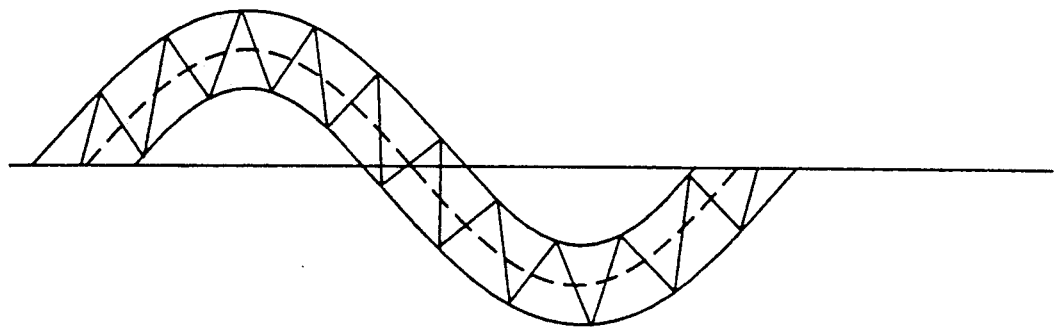

FIG. 2 depicts in greater detail the function block 60 as applied to hysteresis switching. In FIG. 2 hysteresis band width is plotted on the ordinate while percent of commanded motor torque, as a function of maximum available, is represented on the abscissa. As illustrated, block 60 provides a linear increase in band width between two prescribed values of commanded motor torque, i.e., values of $T^*$. Higher values of $T^*$ will not serve to increase band width. Specifically, in the example illustrated, there is a linear increase in band width between 0 and 30% of the maximum available motor torque after which the band width remains constant. FIGS. 3 and 4, in comparison, illustrate the function of the signal on line 62, to expand the band width of the hysteresis switching. Specifically, with respect to FIGS. 3 and 4, the dashed sine wave is the representation one phase of the desired motor current. This would be any of the current command signals $I_A^*$, $I_B^*$ or $I_C^*$. The solid line sine waves indicate the hysteresis band width or dead band while the zig-zag line represents actual motor current (one phase).

In accordance with the present invention, when the $T^*$ signal is small, indicating a low required motor torque, the output of block 60 is small and the hysteresis band width is small resulting in a high switching frequency of motor current. (See FIG. 3.) As the $T^*$ signal increases in value the output of block 60 increases (between the prescribed limits) resulting in a larger hysteresis band width and a lower frequency of current switching. (See FIG. 4.) There is, of course, a constant changing of the frequency of current switching because of the back electromotive force of the motor. In essence, however, it is seen that as the torque command signal increases the frequency of current switching decreases resulting in a higher switching frequency at low torque requirements than at high torque requirements.

Figure 5:
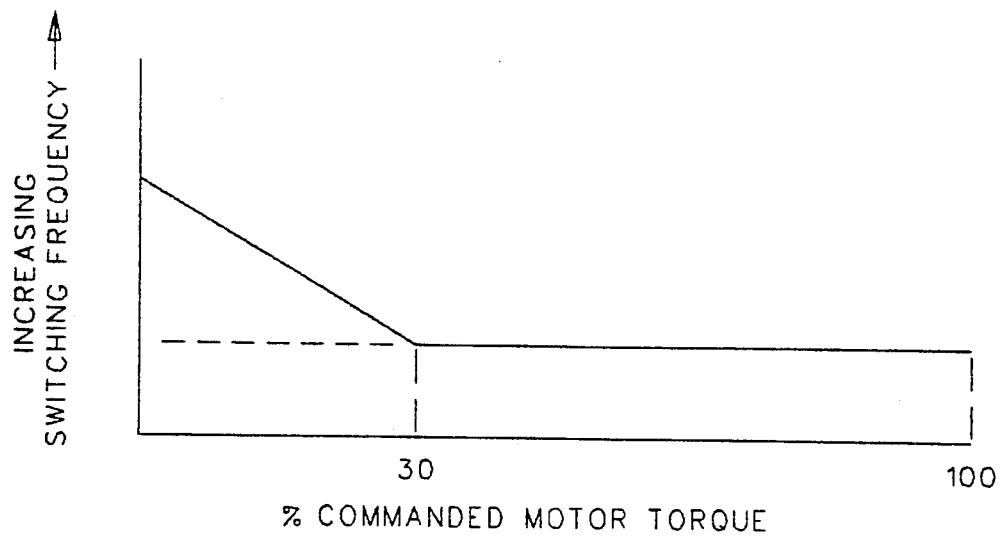
Figure 6:
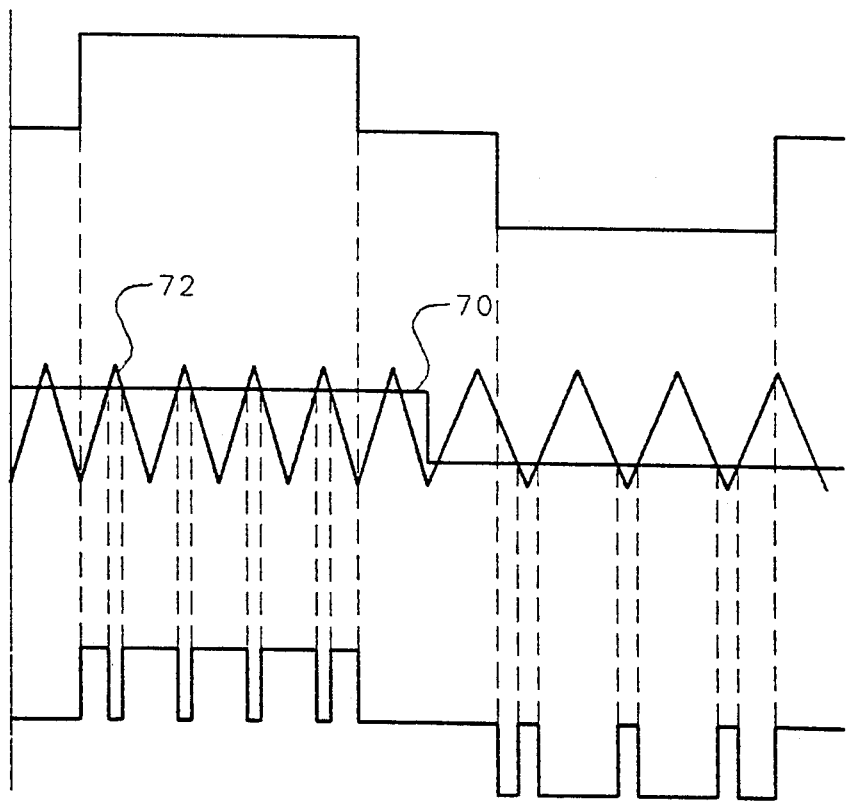

FIGS. 5 and 6 illustrate a second embodiment of the invention employing triangular switching. As before, the output of block 60 is responsive to the $T^*$ signal and FIG. 5 plots the switching frequency on the ordinate and on the abscissa, percent commanded motor torque. Again, the slope terminates and the response becomes constant for torque values above approximated 30% of maximum available motor torque.

FIG. 6 illustrates, in its three traces drawn to the same time base, the principle of triangular switching and the present invention. In this case the explanation lends itself better to voltage wave shapes than to current wave shapes. The first trace of FIG. 6 shows one cycle a basic square wave output voltage for one phase of the bridge 16. It has a 120 electrical degree conduction angle and has a base frequency proportional to desired motor speed. The second trace of FIG. 6 shows two signal lines. A first line 70 is a set reference which goes alternatively positive and negative with each half cycle of the phase as is known in the art. The second signal 72 has a triangular shape of uniform peak-to-peak magnitude and is illustrated as having a higher frequency during the positive half cycle than during the negative half cycle of the upper trace. In accordance with the present invention the function of the signal on line 62 is to change the frequency of the signal 72 so as to vary the number of PWM notches which are present in the output voltage. This, as is known in the art, is achieved by comparing the two signals 70 and 72 and when the latter exceeds the former in absolute magnitude, turning off the associated bridge semiconductor(s) to reduce the output voltage to zero (here more easily viewed as notches) and hence effect a discontinuous current. This notching is indicated in the third trace of FIG. 6 which shows that with a higher frequency, a greater number of notches are provided in the output voltage than at the lower frequency. This, in accordance with the present invention, provides for greater switching at low torque requirements than at high torque requirements.

While the present invention has been described in its preferred embodiments, modifications thereto were readily occur to those skilled in the art. For example, while the invention has been described in its preferred embodiments employing hysteresis and triangular switching, other schemes for providing the pulse-width-modulation, as a function of desired torque, could be employed without departing from the present invention. In addition, while only a linear relationship between the modulation frequency and the torque command has been illustrated, it is apparent that other relationships might be appropriate in any given situation. It is not desired, therefore, that the present invention be limited to that described as shown and it is intended to cover in the appended claims all such modifications as fall within the true spirit and scope of the invention.

What is claimed is:

1. A polyphase alternating current electric motor drive comprising:
   a) a polyphase motor;
   b) a direct current power source;
   c) a polyphase power conversion bridge for converting direct current power from said source to alternating current power for application to said motor;
   d) means to provide a speed signal representing motor rotational speed;
   e) means to provide current signals having values representing corresponding phase currents of the alternating current power applied to said motor;
   f) means to provide a torque command signal having a value representing a desired torque of said motor; and
   g) control means responsive to said speed, current and torque command signals for controlling said power conversion bridge in a pulse-width-modulated mode of operation, said control means comprising frequency modulation control means for enabling a variable number of modulating pulses in each half-cycle of the phase currents responsive to said torque command signal to provide a higher number of modulating pulses at values of said torque command signal representing lesser values of desired torque than at values of said torque command signal representing higher desired values of desired torque;
   h) wherein the higher number of modulating pulses produce a power wave shape more closely approximating a sine wave thereby to lower harmonic heating of the motor when switching currents are lower, and the lower number of modulating pulses reduce switching losses of the power conversion bridge when switching currents are higher.

2. A motor drive in accordance with claim 1 wherein the number of modulating pulses varies linearly between predetermined higher and lower values of said torque command signal.

3. A motor drive in accordance with claim 1 wherein said control means includes a hysteresis type controller having a variable switching band width and wherein said band width varies in response to changing values of said torque command signal to thereby vary the number of modulating pulses.

4. A motor drive in accordance with claim 1 wherein said control means includes a triangular waveshape type controller determining the number of modulating pulses as a direct function of the frequency of the triangular waveshape and wherein said controller responds to values of said torque command signal representing lower values of desired motor torque to provide higher frequencies of the triangular waveshape and to values of said torque command signal representing higher values of motor torque to provide lower frequency of the triangular waveshape.

5. A motor drive in accordance with claim 3 wherein the number of modulating pulses varies linearly between predetermined higher and lower values of said torque command signal.

6. A motor drive in accordance with claim 4 wherein the number of modulating pulses varies linearly between predetermined higher and lower values of said torque command signal.

7. A motor drive in accordance with claim 1 wherein said direct current source is a battery.

8. A method of controlling a pulse-width-modulated alternating electric current motor drive of the type including a polyphase power conversion bridge for providing pulse-width-modulated electrical power to a motor as a function of current switching signals, said method comprising the steps of:
   a) providing a torque command signal having a value representing the desired torque output of said motor; and
   b) generating said current switching signals, said current switching signals serving to effect operation of said bridge at a fundamental frequency proportional to desired motor speed and at a modulation frequency as a function of the value of said torque command signal while enabling a variable number of modulating pulses in each half-cycle of phase currents responsive to said torque command signal to provide a higher number of modulating pulses at values of said torque command signal representing lesser values of desired torque than at values of said torque command signal representing higher desired values of desired torque;
   c) wherein the higher number of modulating pulses produce a power wave shape more closely approximating a sine wave to thereby lower harmonic heating of the motor when switching currents are low, and the lower number of modulating pulses reduce switching losses of the power conversion bridge when switching currents are high.

9. A melted in accordance with claim 8 where the relationship between the change in modulation frequency and the change in the torque command signal is linear between predetermined values of said torque command signal.

10. A method in accordance with claim 8 wherein said modulation frequency is determined by a sine wave hysteresis method with the value of said torque command signal serving to vary the hysteresis band width of said method.

11. A method in accordance with claim 8 wherein said modulation frequency is determined utilizing a triangular method having a triangular control wave form with the torque command signal determining the frequency of said triangular control wave form.

12. A method in accordance with claim 9 wherein said modulation frequency is determined by a sine wave hysteresis method with the value of said torque command signal serving to vary the hysteresis band width of said method.

13. A method in accordance with claim 9 wherein said modulation frequency is determined utilizing a triangular method having a triangular control wave form with the torque command signal determining the frequency of said triangular control wave form.

14. A polyphase alternating current motor drive of the type in which the motor is provided electrical power from a controllable direct current to alternating current power inverter, said motor drive comprising:
 a) means to provide a torque command signal having a value representing a desired output torque of the motor;
 b) control means for controlling the power inverter in a pulse-width-modulated mode in response to said torque command signal, said control means comprising frequency modulation control means for effecting relatively higher rates of pulse modulation in response to values of said torque command signal representing low values of motor output torque than to values of said torque command representing high values of motor output torque;
 c) wherein the higher number of modulating pulses produce a power wave shape more closely approximating a sine wave to thereby lower harmonic heating of the motor when switching currents are low, and the lower number of modulating pulses reduce switching losses of the power inverter when switching currents are high.

15. A motor drive in accordance with claim 14 wherein the rate of pulse modulation varies linearly between predetermined relatively higher and lower values of said torque command signal.

16. A motor drive in accordance with claim 14 wherein said control means includes a hysteresis type controller having a variable switching band width and wherein said band width varies in response to changing value of said torque command signal to thereby vary the rate of pulse modulation.

17. A motor drive in accordance with claim 14 wherein said control means includes a triangular waveshape type controller determining the rate of pulse modulation as a direct function of the frequency of the triangular waveshape and wherein said controller responds to values of said torque command signal representing lower values of desired motor torque to provide higher frequencies of the triangular waveshape and to values of said torque command signal representing higher values of motor torque to provide lower frequencies of the triangular waveshape.

18. A motor drive in accordance with claim 16 wherein the rate of pulse modulation varies linearly between predetermined higher and lower values of said torque command signal.

19. A motor drive in accordance with claim 17 wherein the rate of pulse modulation varies linearly between predetermined higher and lower values of said torque command signal.

* * * * *